D. & W. F. CHIPMAN.
Corn Planter.
No. 77,255.
Patented April 28, 1868.
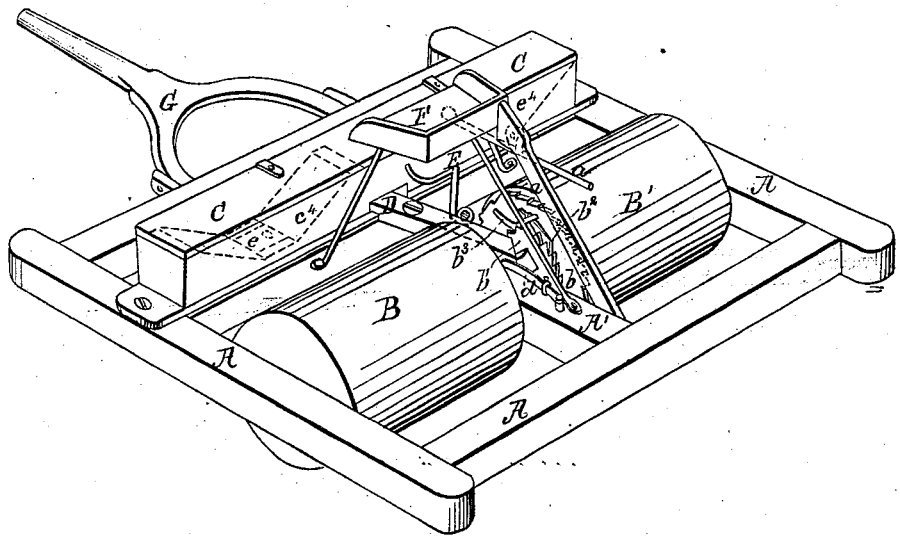
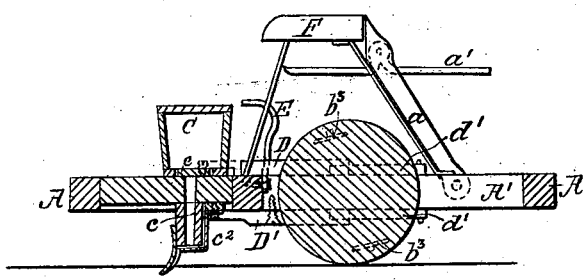
Witnesses.
Alex. Mahon.
Wm. F. Shugert.
Inventor
D. Chipman
W. F. Chipman
by Atty. A. M. Smith

United States Patent Office.

D. CHIPMAN AND WILLIAM F. CHIPMAN, OF MOUNT CARMEL, ILLINOIS.

Letters Patent No. 77,255, dated April 28, 1868.

---

IMPROVEMENT IN MACHINES FOR PLANTING CORN.

---

The Schedule referred to in these Letters Patent and making part of the same.

---

TO ALL WHOM IT MAY CONCERN:

Be it known that we, D. CHIPMAN and WILLIAM F. CHIPMAN, of Mount Carmel, county of Wabash, and State of Illinois, have made certain Improvements in "Machines for Planting Corn;" and we do hereby declare the following to be a full and accurate description of the same, reference being made to the accompanying drawings, forming part of this specification, in which—

Figure 1 represents a perspective view of a machine embracing our improvements.

Figure 2 represents a view of the same in section, the section being taken in line $x\ x$, fig. 1.

Similar letters of reference indicate the same parts in both figures.

Our invention consists in the combination of a loose wheel provided with suitable cam-projections, a fixed ratchet-wheel, and a spring-pawl connecting the former with the latter, all arranged upon the end of a carrying-roller, as hereinafter described.

It also consists in the combination of reciprocating seed-slides, vibrating-levers for communicating motion to the same, and springs for holding said levers in position, arranged as hereinafter described.

It further consists in the employment of a lever pivoted to a movable arm, and used for forcing the loose cam-wheel forward, as hereinafter described.

A suitable frame, A A', is mounted upon two or more rollers, B B', which serve the double purpose of carrying the frame and acting as rollers to cover the seed deposited in the furrows, and also to reduce the unevenness of the ground.

Near the front part of the frame is placed a seed-box, C, constructed in the usual manner, and with two or more compartments having sloping sides. In the bottom of this box is fitted the distributing-slide $c$, provided with a suitable number of holes, so arranged that when the slide is at rest there shall be one hole at the bottom of each compartment. The slide passes over the seed-tubes, which are two or more in number, located directly underneath the seed-box, and are placed at such distance apart as it is desirable for the rows of corn to be from each other. A small furrowing-plough or tooth is attached to each tube, as seen in fig. 2 of the drawings.

A second slide, arranged in guides underneath the frame, is provided with angle-irons or feet, $c^2$, so arranged that when the slides are at rest, the lower horizontal arms of the angle-irons serve to close the lower ends of the seed-tubes, and prevent the escape of the seed therefrom. To these slides are pivoted respectively the two levers D D', the said levers being in turn pivoted respectively to the upper and lower sides of the middle piece A' of the frame.

Two springs, $d\ d'$, are also attached to frame-piece A', the free ends of which act upon the rear ends of levers D D', forcing them towards the roller B'. Upon the axle of the roller B' is loosely fitted a toothed wheel, $b$, and upon the same axle is rigidly fixed a ratchet-wheel, $b'$, a spring-pawl, $b^2$, on the former, connecting it with the latter, thereby causing the wheel to revolve with the forward motion of the roller B', but permitting it to remain stationary whenever said roller moves backward.

The wheel $b$ is provided with cam-projections, $b^3$, of any suitable form and material, attached to or formed on its outer face, which, coming in contact with the free rear ends of levers D D', imparts a vibratory motion to said levers, and, through them, a reciprocating motion to slides $c\ c^2$.

It is sometimes desirable that the seed should be dropped as soon as the machine starts forward. To accomplish this, we pivot an arm, $a$, to the main frame, to the upper end of which is pivoted a hand-lever or pawl, $a'$. By grasping the upper end of this lever, the attendant can make the lower end engage with the teeth upon the periphery of the wheel $b$, and force said wheel forward until one of the cams is in position to act upon the lever B, which will then be operated immediately upon the starting of the machine.

A foot-lever, E, is pivoted to the main frame near lever D, by means of which said lever may, when desired, be held out of reach of the cams actuating it. A suitable seat, F, for the attendant, is mounted upon the main frame, and a draught-pole, G, is hinged to said frame, by means of which the machine is drawn forward.

The cams $b^3$ are arranged at such distances apart on the wheel $b$ as it is desired the hills of corn shall be apart from each other in the rows.

As shown in the drawings, the machine plants but two rows at a time; but it is evident that a greater number of rows may be planted at the same time by simply duplicating some of the parts.

The operation is as follows: The several parts being in the position shown in the drawings, the seed-tubes are closed at both ends by the slides. As the machine moves forward, one of the cams $b^3$ strikes against the lever D, and the free end of said lever is forced to the left, and consequently the forward end of the same, together with the slide $c$, will be carried to the right. By this movement the perforations in the slide are carried underneath the inclined sides $c^4$ of the box, and are brought directly over the tube $c^1$, allowing the seed contained therein to drop into said tubes. The cam now releases the lever D, and acts upon the lower lever, D', and its slide, to open the lower ends of the seed-tubes, when the seed drops into the furrows and is covered by the following-rollers. The springs $d\ d'$ force the levers back as soon as released by the cam, and the same operation is repeated by the next cam, and so continued as long as the machine moves forward.

Having now fully described the construction and operation of our machine, what we claim as new, and desire to secure by Letters Patent, is—

1. The combination of the loose wheels $b$, provided with cams $b^3$, ratchet-wheel $b^1$, and spring-pawl $b^2$, arranged and operating substantially as and for the purpose set forth.

2. The combination of the slides $c\ c^2$, levers D D', and springs $d\ d'$, arranged and operating substantially as and for the purpose set forth.

3. The hand-lever $a'$, pivoted to the swinging arm or standard $a$, and operating substantially as and for the purpose set forth.

D. CHIPMAN,
WILL. F. CHIPMAN.

Witnesses:
 THOMAS PAYNE,
 ROBERT BELL.